US008830820B2

(12) United States Patent
Mandal et al.

(10) Patent No.: US 8,830,820 B2
(45) Date of Patent: Sep. 9, 2014

(54) SEMI-CENTRALIZED ROUTING

(75) Inventors: Subhasree Mandal, San Jose, CA (US); Subbaiah Venkata, Sunnyvale, CA (US); Leon Poutievski, Santa Clara, CA (US); Amit Gupta, San Jose, CA (US); Min Zhu, Palo Alto, CA (US); Rajiv Ramanathan, Cupertino, CA (US); James M. Wanderer, Palo Alto, CA (US); Joon Ong, Cupertino, CA (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 13/274,230

(22) Filed: Oct. 14, 2011

(65) Prior Publication Data

US 2013/0094350 A1    Apr. 18, 2013

(51) Int. Cl.
*H04L 12/26*    (2006.01)
*H04L 12/715*    (2013.01)

(52) U.S. Cl.
CPC ............................ *H04L 45/64* (2013.01)
USPC ............................................ 370/217

(58) Field of Classification Search
None
See application file for complete search history.

(56) References Cited

U.S. PATENT DOCUMENTS

| 7,707,594 | B1 | 4/2010 | Foster et al. | |
|---|---|---|---|---|
| 2003/0218982 | A1 | 11/2003 | Folkes et al. | |
| 2008/0285541 | A1 | 11/2008 | Van der Merwe et al. | |
| 2009/0138577 | A1* | 5/2009 | Casado et al. | 709/220 |
| 2009/0257439 | A1* | 10/2009 | Xu | 370/401 |
| 2010/0054267 | A1* | 3/2010 | Bernstein et al. | 370/410 |
| 2012/0250496 | A1* | 10/2012 | Kato | 370/216 |
| 2013/0003753 | A1* | 1/2013 | Bardalai | 370/419 |
| 2013/0060929 | A1* | 3/2013 | Koponen et al. | 709/224 |

FOREIGN PATENT DOCUMENTS

| KR | 865993 B1 | 10/2008 | |
|---|---|---|---|
| WO | WO 2011/065268 | * 6/2011 | H04L 12/56 |

OTHER PUBLICATIONS

Notification of Transmittal of the International Search Report and The Written Opinion of the International Searching Authority, or the Declaration issued in PCT/US2012-059374 on Mar. 19, 2013, 11 pages.

* cited by examiner

*Primary Examiner* — Robert Wilson
*Assistant Examiner* — Ronald H Davis
(74) *Attorney, Agent, or Firm* — Fish & Richardson P.C.

(57) ABSTRACT

Methods, systems, and apparatus, including computer programs encoded on a computer storage medium, for semi-centralized routing. In one aspect, a computer-implemented method receives a network protocol packet at a router adapted for routing data packets to one or more additional routers. The network protocol packet conforms to a routing protocol that provides distributed routing computation. The method also sends the network protocol packet, through a controller, to a selected one of a plurality of route control servers. The method also processes the network control packet at the selected route control server to generate a routing computation result that conforms to the routing protocol. The method also generates routing information based on the routing computation. The routing information conforms to a control protocol that provides centralized routing computation. The method also sends the routing information to the router for routing of data packets based on the control protocol.

30 Claims, 5 Drawing Sheets

SEMI-CENTRALIZED ROUTING

BACKGROUND

This document relates to semi-centralized route computation.

The Internet is made up of multiple autonomous systems. An autonomous system can be a network of multiple machines, including routers, clients, and servers that are each controlled by a network operator, e.g., an Internet service provider or a large corporation. In the autonomous system, a router uses a routing protocol to enable communications between machines in the autonomous system and with machines in other networks and/or other autonomous systems. For example, a router can use a selected routing protocol to direct a communication to and from specific machines. Different routing protocols can be used to direct communications within the autonomous system and communications to a network outside the autonomous system. For example, the border gateway protocol can be used to route data packets outside of the autonomous system, and the internal border gateway protocol or open shortest path first protocol can be used to route data packets within the autonomous system.

Available routing protocols include centralized routing protocols and distributed routing protocols. In a centralized routing protocol, each router operates under the control of a centralized server that has complete information about all other routers in the network (e.g., topological information). In a distributed routing protocol, each router maintains its own information about other routers in (and preferred routing paths within) the network or autonomous system and independently updates such information based on protocol messages received from other routers in the network.

SUMMARY

This specification describes technologies relating to semi-centralized routing.

In general, one innovative aspect of the subject matter described in this specification can be embodied in methods that include the actions of: receiving a network protocol packet at a router adapted for routing data packets to one or more additional routers, wherein the network protocol packet conforms to a routing protocol that provides distributed routing computation; sending the network protocol packet, through a controller, to a selected one of a plurality of route control servers; processing the network control packet at the selected route control server to generate a routing computation result that conforms to the routing protocol; generating routing information based on the routing computation, wherein the routing information conforms to a control protocol that provides centralized routing computation; and sending the routing information to the router for routing of data packets using the control protocol. Other embodiments of this aspect include corresponding systems, apparatus, and computer programs, configured to perform the actions of the methods, encoded on computer storage devices.

These and other embodiments can each optionally include one or more of the following features. The method can include using the routing computation result to generate a network protocol packet that conforms to the routing protocol; and sending the generated network protocol packet to a second router connected to the router, wherein the second router is adapted to route data packets using the routing protocol. The router can be configured to use a centralized control protocol. The method can include prior to receiving the network protocol packet at the router: at the controller, receiving a message from the selected route control server, wherein the response comprises router assignment information to form a mapping between the selected route control server and the router. The router assignment information can include data indicating that the selected route control server is associated with the router. The method can include accessing a mapping prior to sending the network protocol packet to select the selected route control server. The control protocol can be an OpenFlow protocol. The routing protocol can include a border gateway protocol or an open shortest path first protocol. The method can include detecting a failure in the controller; assigning a second controller to manage communications between the router and the plurality of route control servers; and from the controller, transmitting a message to the plurality of route control servers and the router, wherein the message comprises controller status information. The second controller can receive a message from the selected route control server, wherein the response comprises router assignment information to form a mapping between the selected route control server and the router. The route control server can generate the route computation result using the network protocol packet received at the router. The selected route control server can generate the route computation result using the network protocol packet received at the router and network topology information provided by the controller.

Particular embodiments of the subject matter described in this specification can be implemented so as to realize one or more of the following advantages. A network can implement a centralized routing protocol while maintaining compatibility with conventional distributed routing protocols, such as Open Shortest Path First (OSPF) and Border Gateway Protocol (BGP). This allows for the operator of a network to incrementally convert the network from distributed route computation to centralized route computation. In addition, by including at least one standby controller in the control plane to replace the master controller in the event the master controller fails or is unresponsive, it is possible to avoid loss of operability through a single point of failure. In addition, route computation can be centralized to avoid long convergence times and loops. In addition, centralized route computation can also enable optimal route computation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

In general, a network includes a master controller, a plurality of routers and at least one route control server. The master controller and routers are configured to implement a centralized routing protocol, e.g., an OpenFlow protocol, but the routers can interface with routers that use distributed routing protocols to send and receive distributed protocol packets, e.g., OSPF or BGP protocol packets. When a router receives a distributed routing protocol packet, it provides the protocol packet to the master controller. The master controller then passes the network protocol packet to the corresponding route control server. The route control server analyzes the network protocol packet and calculates routing information for the router using a distributed routing protocol, e.g., BGP or OSPF. The route control server can process the calculated route information such that it can be used by the router. For example, the route control server can generate an OpenFlow forwarding table or flow to be used by the router. In some implementations, the route control server provides the calculated route to the master controller, which translates the calculated route information to a format that can be used by the router, such as a forwarding table or an OpenFlow flow. The translated route information is provided to the router.

Figure 1A:
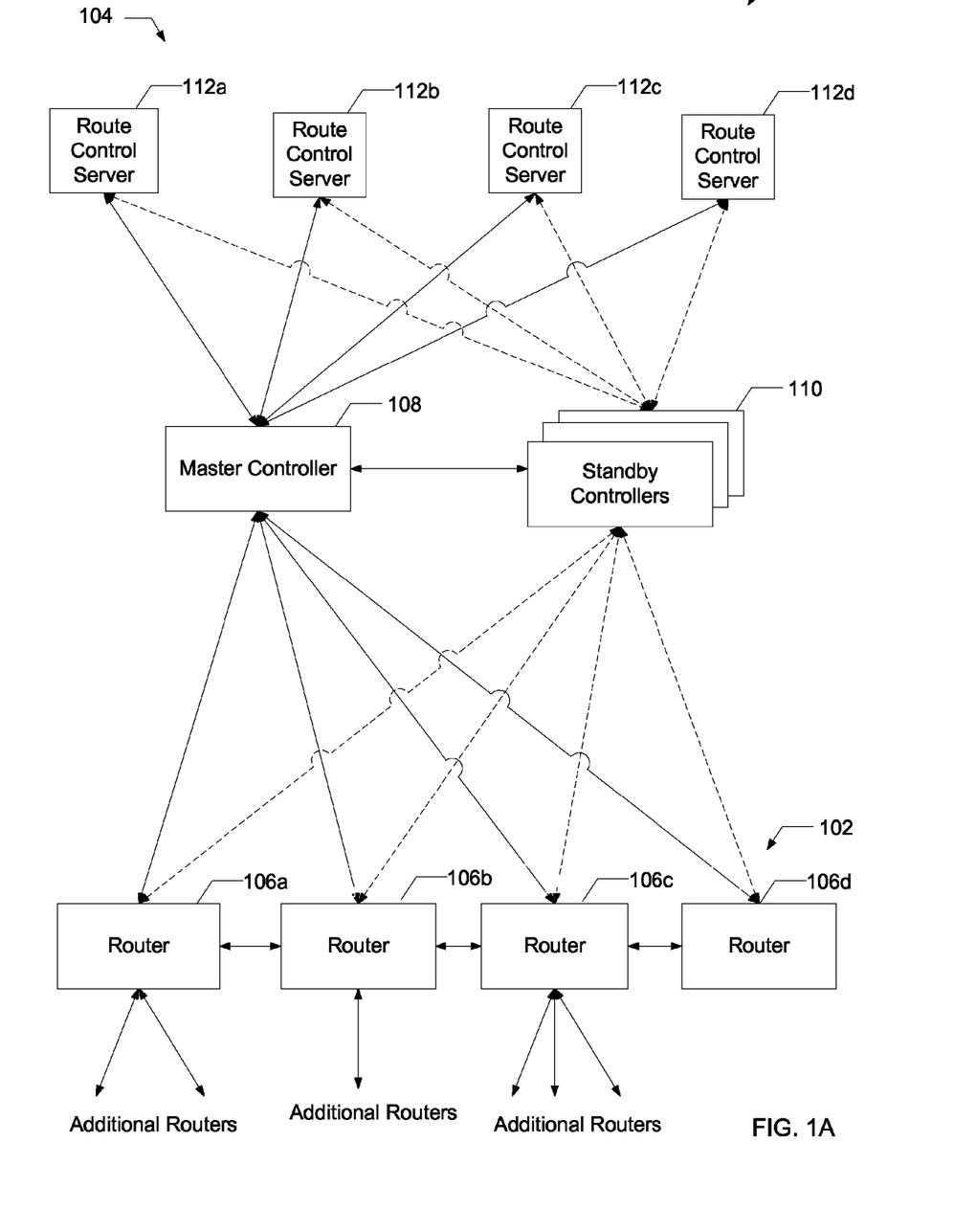
FIG. 1A is a block diagram of an example network that performs semi-centralized routing.

FIG. 1A is a block diagram of an example network 100 that performs semi-centralized routing. The example network 100 includes a data plane 102 and a control plane 104. The data plane 102 includes one or more routers 106a-106d. Network communications are exchanged between the routers 106a-106d and the other connected routers in the data plane 102, which are not shown in FIG. 1A. Although not shown in FIG. 1A, each router 106a-106d can be interconnected. For example, router 106a can be connected to routers 106b, 106c and 106d and router 106b can be connected to routers 106b, 106c and 106d.

It is noted that the routers 106a-106d can include a forwarding table or other data structure used to route data packets according to a centralized routing protocol. Although these tables or data structures are included in the routers 106a-106d, they are considered to be part of the control plane 104.

Figure 1B:
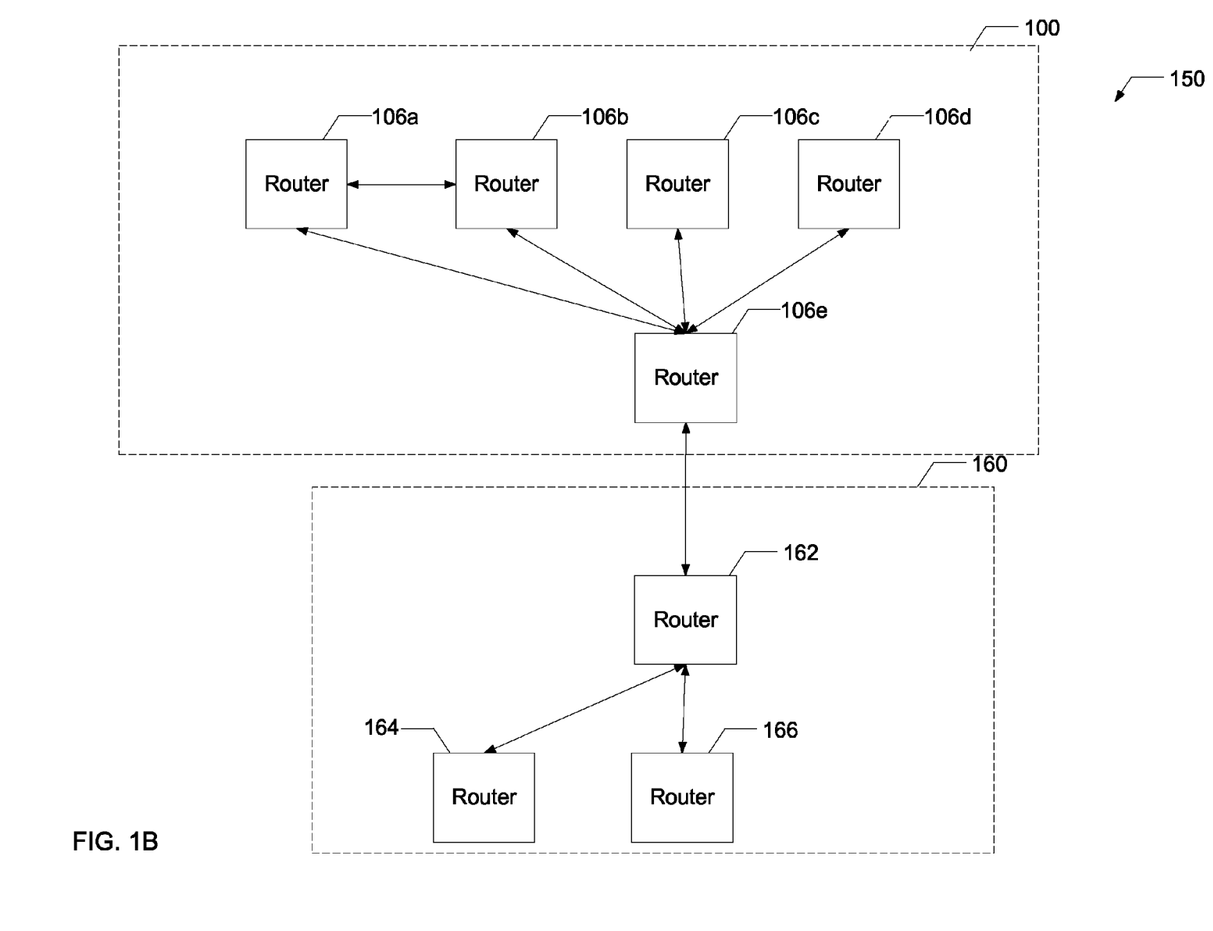
FIG. 1B is a block diagram of an example network.

The routers 106a-106d can be routers that are configured to perform centralized routing. For example, the routers 106a-106d can be configured to be OpenFlow routers. The routers 106a-106d can be connected to other routers in the network 100 and/or other routers that are outside the network 100. For example, FIG. 1B illustrates example connections between the network 100 and another autonomous system 160. FIG. 1B is described below.

The routers 106a-106d can be connected to other OpenFlow routers. In addition, although the routers 106a-106d are configured to use a centralized routing protocol, e.g., OpenFlow, the routers 106a-106d can be connected to routers that use a distributed routing protocol, e.g., BGP or OSPF. As explained below, in such cases, the routers 106a-106d provide the distributed routing protocol packet to the master controller 108 for route calculations.

The control plane 104 includes a master controller 108, at least one standby controller 110 and one or more route control servers 112a-112d. As noted above, the routers 106a-106d include a forwarding table or data structure used by the router to route data packets and are part of the control plane 104. Communications used to control the routers 106a-106d and to configure the control plane 104 are exchanged in the control plane 104.

The master controller 108 can be any type of centralized routing controller that can communicate with and/or control the routers 106a-106d. For example, in some implementations, the master controller 108 is a type of OpenFlow controller that is configured to perform semi-centralized routing and communicate with the routers 106a-106d and the route control servers 112a-d. The master controller 108 can be a server, other type of computer or a computer system (e.g., a network of computers) programmed to perform the operations of the controller.

The master controller 108 can send messages to the routers 106a-106d and route control servers 112a-112d. For example, the master controller 108 can send messages to the routers 106a-106d informing the routers 106a-106d that the master controller 108 is operational and that the routers 112a-112d should communicate with the master controller 108 (i.e., a keep-alive message). The routers 106a-106d can acknowledge or otherwise respond to the keep-alive message and the master controller 108 can determine which routers 106a-106d are operational from the acknowledgement messages. For example, if a router 106 acknowledges or otherwise responds to the keep-alive message, the master controller 108 understands that the router 106 is active. If the router 106 does not acknowledge or respond to the keep-alive message, the master controller 106 can interpret the lack of response to indicate that the router 106 is not operational or has failed. Similarly, the master controller 108 can also send keep-alive messages to the route control servers 112a-112d to inform the routers that the master controller 108 is operational and that the route control servers 112a-112d should communicate with it. Each of the route control servers 112a-112d can acknowledge or otherwise respond to the messages and inform the master controller 108 that it is operational.

The master controller 108 can periodically transmit keep-alive messages to the routers 106a-106d and the route control servers 112a-112d. For example, the master controller 108 can transmit keep-alive messages every 60 seconds or some other predetermined frequency. In some implementations, the master controller 108 broadcasts the message to all of the routers 106a-106d and route control servers 112a-112d at the same time. In some implementations, the master controller 108 can transmit the message to a subset of the routers 106a-106d and/or a subset of the route control servers 112a-112d.

The master controller 108 can configure the control plane. For example, the master controller 108 can send a configuration message to the route control servers 112a-112d. In response, the master controller 108 can receive messages from the route control servers 112a-112d that inform the master controller 108 that a particular route control server 112 (e.g., route control server 112) is associated with a particular router 106 (e.g., router 106a) or a particular group of routers (e.g., routers 106a and 106c) and is to perform route calculations for the associated router(s) 106. The master controller 108 can collect this information and create a table or other data structure that represents the relationships between the routers 106a-106d and the route control servers 112a-112d (i.e., a route control table). For example, for each router 106a-106d, the route control table can represent which route control server 112a-112d is assigned to perform route calculations for the router 106a. In some implementations, there is a one to one correspondence between route control servers 112 and routers 106 such that each route control server 112 performs route calculations for one router 106. For example, FIG. 1A illustrates a one to one correspondence between routers 106a-106d and route control servers 112a-112d. In some implementations, a route control server 112 performs route calculations for two or more routers 106. In some implementations, the master controller 108 can be programmed with the route control table and does not generate the route control table from messages received from the route control servers 112a-112d.

In some implementations, the master controller 108 transmits the configuration message when the master controller 108 becomes active, e.g., when a standby controller 110 is assigned to become the master controller, or during network initialization. In addition, in some implementations the master controller 108 can transmit these messages in response to a change in topology. For example, if a router 106a does not acknowledge a keep-alive message, the master controller 108 can determine that the router 106a is no longer active and transmits keep-alive messages to the other routers 112b-112d to update its route control table. The master controller 108 can also determine that a router 106 has failed using other signals. For example, the master controller 108 can detect that a router 106 has failed or is disconnected by detecting a disconnect signal from the underlying transport protocol.

In some implementations, if the master controller 108 determines that a router 106 or route control server 112 has failed or is not operational, the master controller 108 can reconfigure the route control table to account for the failure. For example, if the master controller 108 determines that a route control server 112 is not operational, the master controller 108 can disable the router(s) corresponding to the route control server 112 or can update the route control table to indicate that the router(s) corresponding to the route control server 112 should also be not operational. In some implementations, the master controller 108 can enable another route control server to replace the failed route control server and update the route control table to reflect this new route control server.

The master controller 108 can collect the topology information from the routers 106a-106d and/or the route control servers 112a-112d. For example, the master controller 108 can collect topology information from the calculated route information provided by the route control servers 112a-112d. In some implementations, the master controller 108 analyzes the calculated route information received from each of the route control servers 112a-112d and determines the existing network connections and latencies associated with each of the connections. As another example, the master controller 108 can determine topology information from the routers' 106a-106d acknowledgment of a keep-alive message or a lack of acknowledgement. The master controller 108 can store the topology information and provide it to the route control servers 112a-112d, which can use the topology information to calculate routing information.

As indicated above, when a router 106a-106d receives a distributed routing protocol packet, the routers 106a-106d provide the distributed protocol packet to the master controller 108. In response, the master controller 108 determines which route control server 112a-112d should process the distributed protocol packet. For example, the master controller 108 can access the route control table to determine which route controller server 112a-112d is associated with the router 106a-106d that provided the network control packet. The master controller 108 then forwards the distributed routing protocol packet to the corresponding route control server 112a-112d, which performs route calculations using the distributed routing protocol and provides the route calculations to the master controller 108. The route control server 112 is explained in greater detail below.

The control plane 104 can include one or more standby controllers 110. The standby controllers 110 are similar to the master controller 108 but do not receive communications from the route control servers 112a-112d or the routers 106a-106d until the master controller 108 fails or otherwise becomes nonoperational. For example, the master controller 108 can suffer a hardware or software failure and become nonoperational. As a result of the failure, a standby controller 110 is notified of the failure and assumes the responsibilities of the master controller. In some implementations, the route control servers 112a-112d can detect the master controller's failure because it does not receive a keep-alive message during a predetermined time period. As a result, the route control server 112a-112d can send a message to the standby controller 110 that indicates the master controller 108 has failed and the standby controller 110 is now assigned the role of master controller. Various methods can be used to choose a standby controller 110. For example, the route control servers 112a-112d can be programmed with a predetermined sequence of standby controllers 110 and the route control servers can select standby controllers 110 in sequential order.

The standby controller 110 configures the control plane 104 by transmitting configuration messages to the route control servers 112a-112d. The new master controller 110 can receive the configuration messages from the route control servers 112a-112d and reconstruct a route control table. In addition, the standby controller 110 can transmit keep-alive messages to the routers 106a-106d and the route control servers 112a-112d. As described above, the keep-alive messages indicate that the route control servers 112a-112d and routers 106a-106d should communicate with the standby controller 110, which is acting as the master controller.

In some implementations, the standby controller 110 receives communications from the route control servers 112a-112d and the routers 106a-106d while the master controller 108 is active. The standby controller 110 mimics some of the operations of the master controller 108, e.g., creating a route control table and maintaining topology information, such that when the master controller 108 fails, the standby controller 110 can assume the role of the master controller without building a new route control table or otherwise configuring the control plane. In these implementations, the route control servers 112a-112d and routers 106a-106d communicate with both the master controller 108 and the standby controllers 110.

In some implementations, the master controller 108 transmits the topology information and the route control table to the standby controller 110 as the topology information and route control table are generated or updated. In some implementations, the master controller 108 periodically provides the topology information and route control table. In such implementations, the standby controller 110 can use the received topology information and route control table when it is assigned the role of the master controller.

The route control servers 112a-112d are configured to process distributed routing protocol messages. The route control servers 112a-112d can be implemented on machines separate from the master controller 108. In some implementations, each route control server 112 can be implemented on an independent machine or computer. In some implementations, multiple route control servers 112 can be implemented on virtual machines operating on a single computer or machine or on a computer system that may include multiple computers.

As indicated above, each route control server 112a-112d is associated with a particular router 106 or a particular group of routers 106. A network operator or administrator can specify with which router 106 each route control server 112 is associated or the associations can be defined through an automated process (e.g., to distribute the responsibility for routers based on workloads of the available route control servers and/or the machines on which the route control server processes are implemented).

The route control servers 112a-112d receive distributed routing protocol packets from the master controller 108 and perform route calculations for the routers 106a-106d. For example, the route control server 112a can receive the distributed routing protocol packet (e.g., BGP or OSPF packets) and calculate the routing information based on the routing protocols. In some implementations, the route control servers 112a-112d can process the calculated routing information to be in a format that can be used by router 106 to forward data packets. For example, the routing route control serve 112a can process a BGP based routing information to be an Open-Flow flow or a forwarding table that can be used by the router 106 to route data packets.

In some implementations, the route control servers 112a-112d can be configured to perform route calculations based on multiple distributed routing protocols. In these implementations, the route calculations are based on the appropriate distributed routing protocol. For example, the route control server 112 can analyze the distributed routing protocol packet to determine the routing protocol associated with the packet and use the appropriate routing protocol to calculate the route information. Various distributed routing protocols can be used. For example, the route control server 112a-112d can be configured to perform BGP or OSPF route calculations. In some implementations, the route control servers 112a-112d process the protocol packets to identify changes (e.g., topological changes or network traffic-based changes) in the network. Based on these changes, the route control servers 112a-112d perform route calculations to identify new routings (i.e., routings that are used to update the routing tables). The routing tables can then be used by the routers. For example, in some implementations, the route control servers 112a-112d can process the BGP or OSPF protocol packets (i.e., that contain information about the topology of the network and/or network status information) to generate routing information that can be used to update an entry in a forwarding table or a flow used in OpenFlow. The route control servers 112a-112d provide the route calculations to the master controller 108.

In some implementations, the route control servers 112a-112d determine route information and provide the calculated route information to the master controller 108. After the master controller 108 receives the route determinations it translates the routing information into a forwarding table that can be used by the routers 106a-106d. For example, the master controller 108 can receive the route calculations, which are calculated using the distributed routing protocol, e.g., BGP or OSPF, and converts the route calculations into a flow that can be used by OpenFlow routers. The master controller 108 can update a forwarding table to include the flow. The master controller 108 provides the forwarding table to the router 106 that received the network protocol packet. The router 106 can use the forwarding table to route routing data packets. In some implementations, the master controller 108 can use the route calculations to provide information about changes in the network topology to the other route control servers regardless of whether the other route control servers received a distributed routing protocol packet. The route control servers can use the information to perform their own route calculations and update routing information for the routers.

In addition, the route control servers 112a-112d can use the route calculations to generate a distributed routing protocol packet based on the route calculations. The distributed routing protocol packet can be provided to the routers 106a-106d, through the master controller 108. The routers 106a-106d can then transmit the distributed routing protocol packet to its neighboring routers as if it were a router performing a distributed routing protocol.

FIG. 1B illustrates an example network 150. FIG. 1B illustrates an example implementation of the network 100, configured to perform semi-centralized routing, and interface with a network or an autonomous system 160 that is configured to perform distributed routing.

The example network 150 includes the network 100 and an autonomous system 160. FIG. 1B illustrates a portion of the network 100. As explained above, the routers 106a-106d are configured to perform centralized routing of data packets and are connected to a master controller, which is not shown in FIG. 1B. The routers 106a-106d, which can also be interconnected, are connected to a border router 106e, which is also configured to perform centralized routing of data packets and is connected to the master controller. The border router 106e is at the boundary of network 100 and autonomous system 160. The border router 106e can interface with routers outside of network 100. For example, border router 106e can interface with autonomous system 160 and exchange network protocol packets and data packets with the autonomous system 160.

Autonomous system 160 can be operated by a company or operator different from the operator of the network 100 and is configured to perform a conventional distributed routing protocol. In some implementations, the autonomous system 160 is operated by the same operator of the network 100 but is configured to perform a conventional distributed routing protocol.

The autonomous system 160 includes a border router 162 and routers 164 and 166. The border router 162 can be a router at the boundary of the autonomous system 160 and other networks and/or autonomous systems, e.g., the network 100. The border router 162 can exchange network protocol packets and data packets with the border router 106e. The border router 162 can be configured to perform a distributed routing protocol. For example, the border router 162 can be configured to use the BGP protocol to interface with network 100 and/or other autonomous systems.

The border router 162 can interface with the routers 164 and 166, which are conventional routers and configured to perform distributed routing within the autonomous system 160. For example, the routers 164 and 166 can communicate with the border router 162 using a distributed interior gateway protocol, e.g., internal BGP or interior gateway routing protocol (IGRP).

In some implementations, the network 100 includes the autonomous system 160. For example, the autonomous system 160 can be operated by the entity that operates the network 100. In such implementations, the network 100 includes the routers 106a-106d, which are configured to perform centralized routing of data packets and are connected to a master controller, and conventional routers 164 and 166, which are configured to perform distributed routing, and is configured to perform both the distributed routing and the centralized routing.

Figure 2:
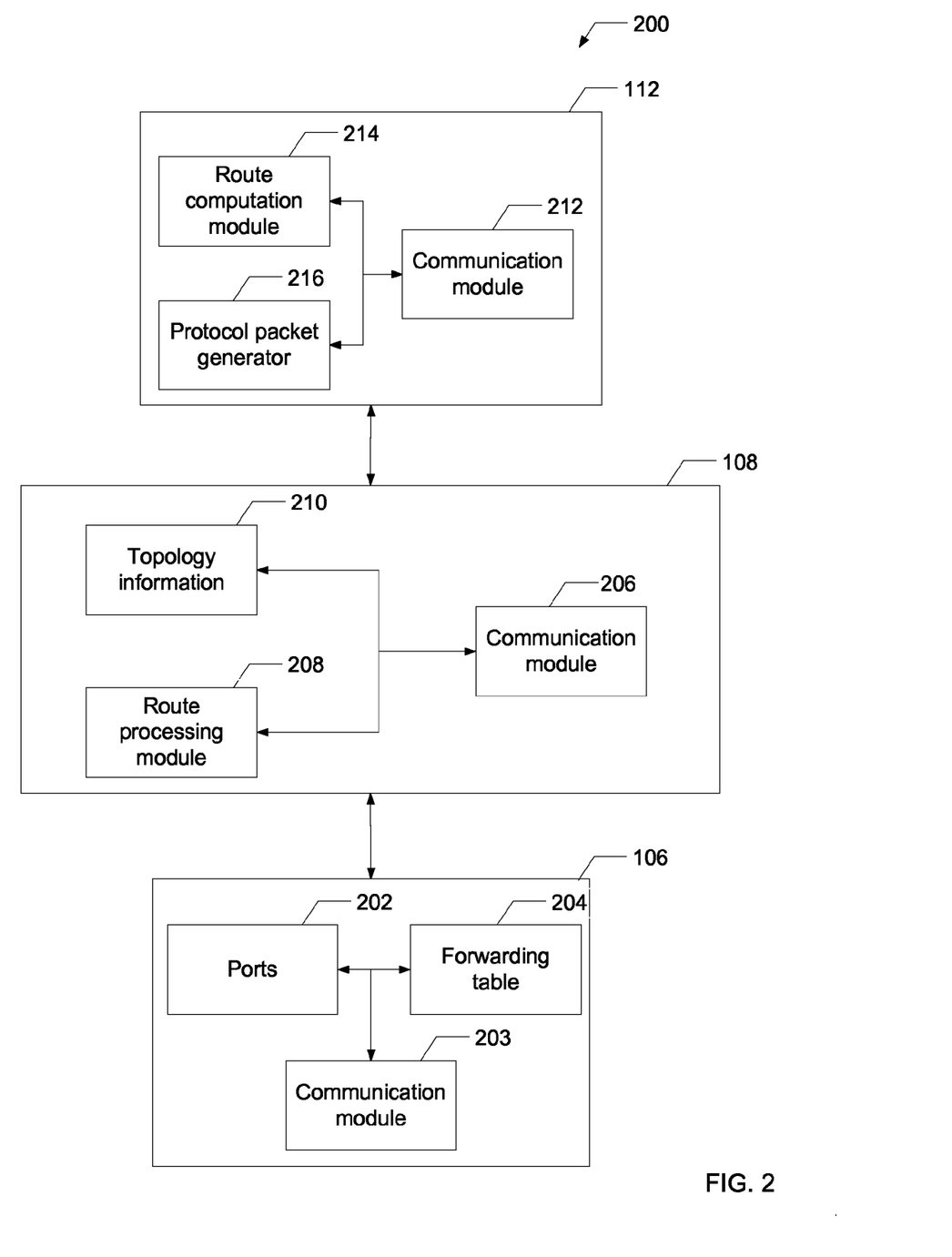
FIG. 2 is a block diagram of an example network that performs semi-centralized routing.

FIG. 2 illustrates an example block diagram of an example network 200 that performs semi-centralized routing. The network 200 includes a router 106, a master controller 108 and a route control server 112.

The router 106 includes one or more ports 202 and a forwarding table 204. The plurality of ports 202 can be interfaces for the router 106 to connect to other routers and machines on the network. Data packets and protocol packets are received at the plurality of ports 202 and exit the router 106 from the plurality of ports 202. The plurality of ports 202 can be physical ports, virtual ports defined by the centralized routing protocol, or a combination of physical and virtual ports. The plurality of ports 202 can be assigned a port number and can be used to control communications to/from the router 106.

The forwarding table 204 includes information used by router 106 to forward data packets. The forwarding table information can be provided by the master controller 106. For example, the master controller 106 can provide the router 106 with an OpenFlow flow or a forwarding table for the router 106 to use for forwarding data packets. As explained above, in some implementations, the master controller 108 or the route control server 112 can process the routing information to be in a format that can be used by the router 106.

The master controller 108 includes a communication module 206, a route processing module 208 and topology information 210. The communication module 206 can be configured to receive a distributed routing protocol packet from the router 106 and provide it to the route control server 112. The communication module 206 also can receive the calculated routing information provided by the route control server 112. In addition to transmitting/receiving routing protocol packets and routing information, the communication module 206 can transmit messages to the router 106 and the route control server 112. For example, the communication module 206 can transmit configuration messages or keep-alive messages to the router 106 and route control server 112. The communication module 206 also can receive messages from the router 106 and/or route control server 112. For example, the communication module 206 can receive acknowledgment messages, responses or other messages from the router 106 and/or route control server 112.

In some implementations, the master controller 108 includes a route processing module 208. The route processing module 208 is configured to process routing information that is received from the route control server 112. For example, in some implementations, the master controller 108 can receive the calculated routing information from the route control server 112 and provide the routing information to the route processing module 208 to process the routing information to be in a format that can be used by the router 106 to forward data packets. In some implementations, the route processing module 208 is configured to convert routing information, which may be based on BGP or OSPF routing protocols or another format that needs to be converted for use by the router 106, to be an OpenFlow flow or a forwarding table or other structure that can be used by the router 106 to route data packets.

The route processing module 208 can include a route control table that stores information describing the relationship between the routers 106 and the route control server 112. For example, the route control table can store information describing which route control server 112 is configured to perform distributed routing calculations for a router 106. The route processing module 208 can build the route control table from the configuration messages received from the route control servers 112. The route processing module 208 can access the route control table to determine which route control server 112 should perform route calculations for a particular router 106.

The master controller 108 can generate the topology information 210 from the routing calculations it receives from the route controller servers 112. For example, the master controller 108 can receive calculated routing information from the route control server 112 and analyze the routing information to determine network topology information 210. As the master controller 108 receives calculated routing information from other route control servers 112, the master controller can add the additional information to the network topology information 210 and gain information as to the global topology of its routing domain. As explained above, the master controller 108 can provide the topology information 210 to the route control servers 112 along with distributed protocol packets. The route control server 112 can use the topology information 210 to calculate the routing information, which can facilitate faster convergence to an appropriate routing configuration.

The route control server 112 can include a communication module 212, a route computation module 214 and a protocol packet generator 216. The communication module 212 can receive distributed protocol packets from the master controller 108 and transmit the calculated routing information to the master controller 108. In addition, the communication module 212 can receive messages from the master controller 108. For example, the communication module 212 can receive keep-alive messages and configuration messages from the master controller 108. In addition, the communication module 212 can send messages to the master controller 108. For example, the communication module 212 can send a message that indicates for which router(s) 106 it is configured to perform routing calculations.

The route computation module 214 can receive a distributed protocol packet 214 from the communication module 212 and calculate routing information from the protocol packet. For example, the route computation module 214 can receive a BGP or an OSPF protocol packet and calculate the routing information based on the BGP or OSPF protocols. In some implementations, the routing computation module 214 can process the calculated routing information to be in a format that can be used by router 106 to forward data packets. For example, the routing computation module 214 can process a BGP based routing information to be an OpenFlow flow or a forwarding table that can be used by the router 106 to route data packets. In some implementations, the route computation module 214 does not process the calculated routing information and provides the calculated routing information to the master controller 108 for processing.

The protocol packet generator 216 can receive the calculated route information from the route computation module 214 and generate a distributed network protocol packet based on the calculated route information. For example, the protocol packet generator 216 can be configured to generate a BGP protocol packet using the calculated route information, which was calculated based on the BGP protocol packet. As explained above, the router 106 can transmit the distributed routing protocol packet to its neighboring routers, similar to a router 106 that is configured to perform distributed routing.

Figure 3:
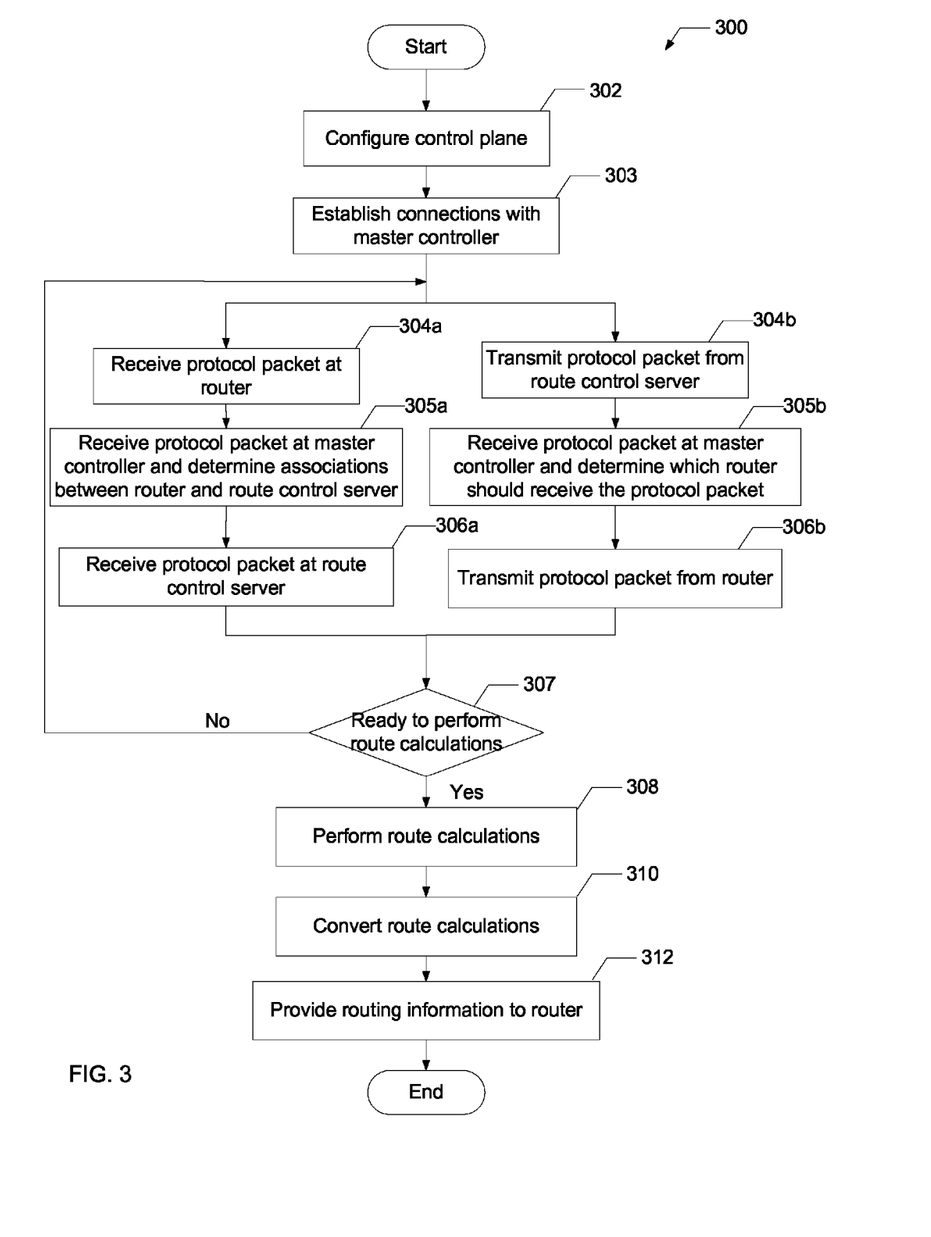
FIG. 3 is a flowchart of an example process for semi-centralized routing.

FIG. 3 illustrates a flowchart of an example process 300 for semi-centralized routing. Process 300 begins by configuring the control plane (at 302). For example, the master controller 108 can transmit the configuration messages to the route control servers 112a-112d and receive responses or other messages from the route control servers 112a-112d that include information indicating the router 106 it is associated with. The master controller 108 can use these messages to determine which route control server 112 correspond to each of the routers 106a-106d. The master controller 108 can create a route control table using the information provided by the router control servers 112a-112d.

The master controller 108 can also establish a connection with each route control server and a connection with each router (at 303). For example, in some implementations, the master controller 108 can send keep-alive messages to the routers 106a-106d and the route control servers 112a-112d. The keep-alive messages can inform the routers 106a-106d that distributed routing protocol packets should be transmitted to it. The master controller 108 can use the acknowledgment messages provided by the routers 106a-106d to determine a network topology. For example, if the master controller 108 does not receive an acknowledgment message from the router 106c, it can determine that the router 106c has failed or is not operational.

In addition, the master controller 108 can also transmit keep-alive messages to the route control servers 112a-112d to determine which route control servers 112 have failed or is not operational. In addition, the master controller 108 can transmit the keep-alive messages to the route control servers 112a-112d to inform the route control servers that it is the master controller 108.

A distributed routing protocol packet is received at a router (at 30a). For example, the router 106a can receive a distributed routing protocol packet, such as a BGP protocol packet. The router 106a can be configured to provide the distributed routing protocol packet to the master controller 108.

In response, the master controller 108 receives the protocol packet and determines which route control server 112a-d is associated with the router 106a (at 305a). For example, the master controller 108 can access the route control table to determine which route control server is to perform the route calculations for the router 106a.

The master controller provides the distributed routing protocol packet to the route control server (at 306a). For example, the master controller 108 can provide the distributed routing protocol packet to the route control server 112a, which the master controller 108 determined to be assigned to perform route calculations for the router 106a. In some implementations, the master controller 108 can also provide network topology information to the route control server 112a. Example network topology information includes information describing the routers 106 (inside and/or outside the network 100) that are linked to the router 106a and latency times or congestion information associated with these connections.

In addition to receiving a distributed routing protocol packet, the route control server transmits a distributed protocol packet (at 304b). For example, the route control server 112a can generate a distributed protocol packet (e.g., OSPF or BGP) that is to be transmitted to devices, such as other routers, connected to router 106a. The route control server 112a can transmit the distributed protocol packet to the master controller 108.

The master controller receives the distributed protocol packet and determines which router should receive the distributed protocol packet provided by the route control server (at 305b). For example, the master controller 108 can determine which router should receive the distributed protocol packet based on the route control table generated from the configuration messages. The master controller 108 then transmits the distributed protocol packet to the appropriate router.

The router receives the distributed protocol packet and broadcasts the distributed protocol packet to its neighboring routers (at 306b). For example, router 106a can receive the distributed protocol packet and transmit the packet to other routers, such as neighboring routers.

As the protocol packets are being exchanged with the network 100 (304a,b-306b,b), the number of protocol packets exchanged is monitored by the master controller 108 and/or the route control servers (at 307). If the number of protocol packets is below a predetermined threshold, the process continues and additional protocol packets are exchanged (at 304a and 304b). If the number of protocol packets is greater than or equal to the predetermined threshold, the process continues at 308. The predetermined threshold can be based on the distributed routing protocol implemented by the route control servers. For example, the predetermined threshold can be based on reaching a certain state in a state-machine maintained by the distributed routing protocol (e.g., BGP or OSPF protocols). As another example, the predetermined threshold can be based on a number of protocol packets exchanged that establishes sufficient states for routing packets based on the BGP or OSPF protocols.

The route control server receives the distributed protocol packet from the master controller and performs route calculations for the router (at step 308). The route control server 112a can be configured to perform route calculations for various distributed routing protocols. For example, the route control server 112a can use the network topology information provided by the master controller 108 and perform route calculations based on the BGP and/or OSPF protocols.

The route control server 112a converts the calculated route information (at 310). For example, in some implementations, the route control server 112a processes the computed route information into a format that can be used by the router 106a to route data packets. For example, the route control server 112a can convert the calculated route information to be a forwarding table or flow. The route control server 112a provides the calculated route information to the master controller 108. In some implementations, the route control server 112a also generates a distributed routing protocol packet that is based on the computed route information, which is also provided to the master controller 108.

Figure 4:
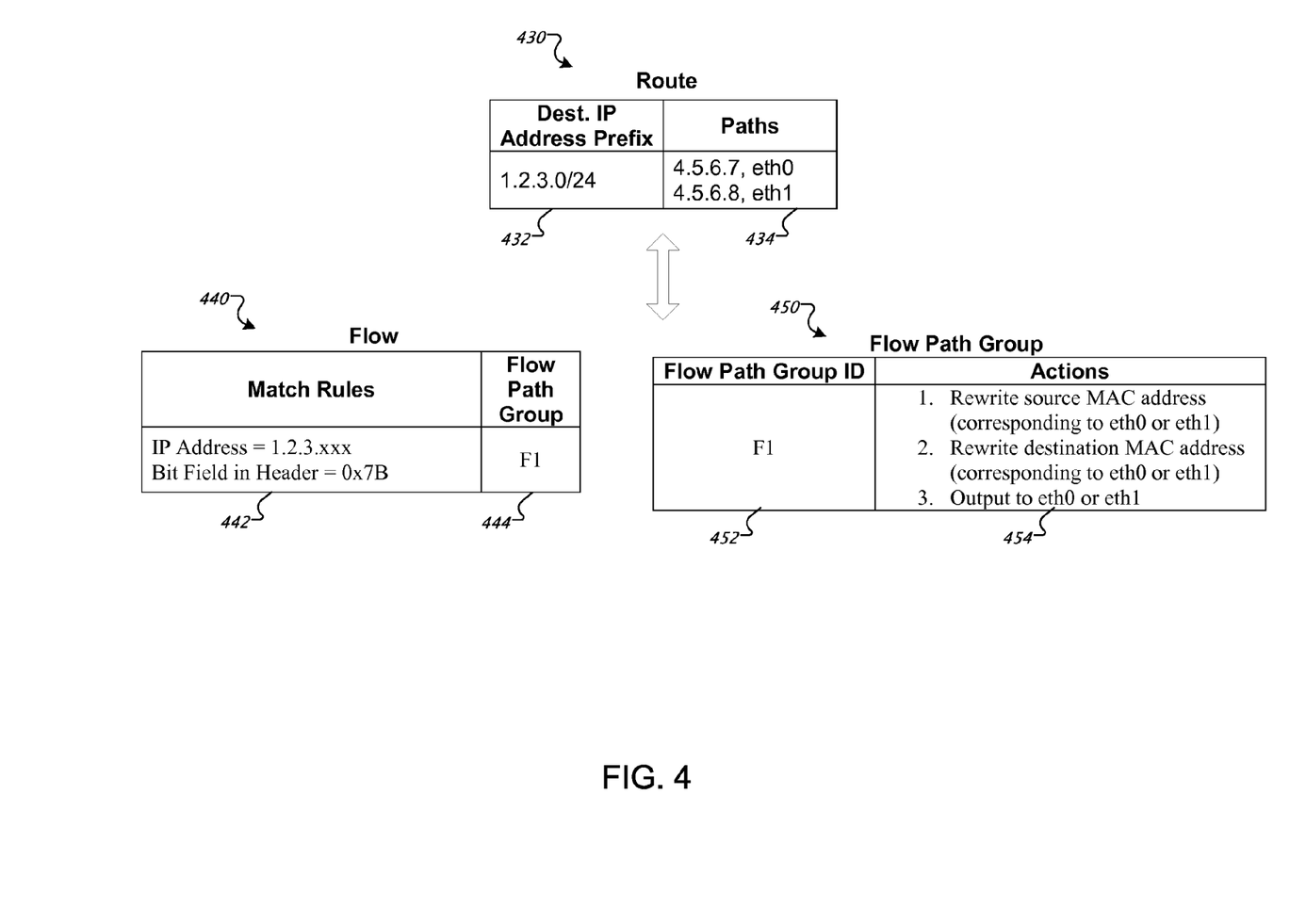
FIG. 4 is an illustration of an example conversion from a route to flow.

In some implementations, the route control server provides the calculated route information to the master controller, which converts the route calculations to a format that can be used by the router (at 310). For example, the master controller 108 can convert the route calculations, which are in a distributed routing protocol format, to a centralized routing protocol format, such as a forwarding table. In some implementations, the master control 108 can convert a BGP or OSPF based route calculation to a forwarding table that can be used by an OpenFlow router. The master controller 108 can use various techniques to convert the calculated route information to a flow. For example, FIG. 4 is a diagram of an example conversion of route information into a flow. The conversion of route information into a flow as illustrated in FIG. 4 can be performed, for example, by the master controller 108.

A route 430 as specified by a distributed routing protocol can include a destination IP address prefix 432 and a set of one or more paths or "nexthops" 434, in addition to many other types of data. The prefix can be specified by a mask, e.g., "24", indicating that only the most significant 24 bits are significant. Each path includes an IP address, e.g. 4.5.6.7, and an outgoing interface identifier, e.g. "eth0," for Ethernet port 0. The route 130 can be converted into a corresponding flow 140. The flow 440 includes one or more match rules 442. The match rules 442 can include a pattern for the IP Address, e.g. 1.2.3.xxx, where "x" is a placeholder that can assume any appropriate value, in addition to many other types of data. For example, the match rule 442 can also specify that a particular bit field in a network packet header must be a particular value, e.g. 0x7B.

The flow 440 includes a flow path group identifier 444 to a flow path group 450, which specifies a set of actions to be taken upon encountering a network packet that matches match rules 442. The flow path group 450 includes an identifier 452 as a key and a corresponding set of actions 454 as a value. In some implementations, the actions can be stored with the flow 440, rather than being stored in a flow path group 450. However, maintaining the flow path groups 450 in a separate table allows the flow path group definitions to be reused for other flows as well. The controller can, but need not, ensure that all flow path groups with a same set of actions have only a single entry in a flow path group table.

The actions 454 to be taken by a network device can be analogous to those actions taken when the network device forwards traffic according to a distributed routing protocol. For example, the set of actions 454 can include actions to rewrite the source media access control (MAC) address of a packet, rewrite the destination MAC address of a packet, and output the packet to one of a set of interfaces, e.g., eth0 or, eth1.

Returning to FIG. 3, the master controller provides the converted route information to the router (at 312). For example, the master controller 108 can push the forwarding table or the calculated flow to the router 106a. The router 106a can then use the route information to forward distributed routing protocol based data packets as they are received. In addition, the master controller 108 can provide the generated distributed routing protocol packet to the router 106a. The router 106a can transmit the protocol packet to neighboring routers. While the operations of process 300 are depicted in the drawings in a particular order, this should not be understood as requiring that such operations be performed in a particular order shown or in sequential order, or that all illustrated operations be performed, to achieve desirable results.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non volatile memory, media and memory devices, including by way of example semiconductor memory devices, e.g., erasable programmable read only memory ("EPROM"), electrically erasable programmable read only memory ("EEPROM"), and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the network 100 can be implemented without a master controller and each router can be connected to the appropriate route control server. As another example, the network 100 can be implemented such that the route control servers and master controller are implemented as virtual machines or processes on one computer. As another example, the master controller can configure the control plane without receiving messages from the route control servers. Instead, the master controller can randomly assign routers to route control servers. As another example, protocols other than Openflow can be used between the master controller and the routers. As another example, the master controller can implement routing protocols. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving a network protocol packet at a router adapted for routing data packets to one or more other routers, wherein the network protocol packet conforms to a routing protocol that provides distributed routing computation;
   sending the network protocol packet, through a controller, to a selected one of a plurality of route control servers;
   processing the network protocol packet at the selected route control server to generate a routing computation result that conforms to the routing protocol;
   generating routing information based on the routing computation result, wherein the routing information conforms to a control protocol that provides centralized routing computation;
   sending the routing information to the router for routing of data packets based on the control protocol;
   detecting a failure in the controller;
   assigning a second controller to manage communications between the router and the plurality of route control servers; and
   transmitting, from the second controller, a message to the plurality of route control servers and the router, wherein the message comprises controller status information.

2. The computer-implemented method of claim 1 wherein the router is configured to use a centralized control protocol.

3. The computer-implemented method of claim 1 further comprising:
   using the routing computation result to generate a network protocol packet that conforms to the routing protocol; and
   sending the generated network protocol packet to a second router connected to the router, wherein the second router is adapted to route data packets using the routing protocol.

4. The computer-implemented method of claim 1 further comprising:
   prior to receiving the network protocol packet at the router:
   at the controller, receiving a message from the selected route control server, wherein the message comprises router assignment information to form a mapping between the selected route control server and the router.

5. The computer-implemented method of claim 4, wherein the router assignment information comprises data indicating that the selected route control server is associated with the router.

6. The computer-implemented method of claim 1 further comprising:
   accessing a mapping prior to sending the network protocol packet to select the selected route control server.

7. The computer-implemented method of claim 1 wherein generating the routing information based on the routing computation result comprises converting the routing computation result to a flow, wherein the routing information comprises the flow.

8. The computer-implemented method of claim 1 wherein the control protocol comprises an OpenFlow protocol.

9. The computer-implemented method of claim 1 wherein the routing protocol comprises a border gateway protocol or an open shortest path first protocol.

10. The computer-implemented method of claim 1 wherein the second controller receives a message from the selected route control server, wherein the message comprises router assignment information to form a mapping between the selected route control server and the router.

11. The computer-implemented method of claim 1 further comprising:
   sending, by the controller, network topology information to the selected route control server, wherein the selected route control server generates the route computation result using the network protocol packet received at the router and the network topology information.

12. A system, comprising:
a router, wherein the router is configured to:
  route data packets to one or more other routers; and
  receive a network protocol packet, wherein protocol packet conforms to a routing protocol that provides distributed routing computation;
a controller coupled to the router, wherein the controller is configured to:
  receive the network protocol packet from the router and send the network protocol packet to a selected one of a plurality of route control servers; and
the plurality of route control servers, wherein the selected one of the plurality of route control servers is configured to:
  process the network protocol packet to generate a routing computation result that conforms to the routing protocol; and
  send the routing computation result to the controller;
the controller is further configured to:
  generate routing information based on the routing computation, wherein the routing information conforms to a control protocol that provides centralized routing computation;
  sending the routing information to the router for routing of data packets based on the control protocol;
wherein the router, the selected one of the plurality of route control servers, or a second controller is configured to:
  detect a failure in the controller;
  assign the second controller to manage communications between the router and the plurality of route control servers; and
  transmit, from the second controller, a message to the plurality of route control servers and the router, wherein the message comprises controller status information.

13. The system of claim 12 wherein the router is further configured to use a centralized control protocol.

14. The system of claim 12 wherein the controller is further configured to:
use the routing computation result to generate a network protocol packet that conforms to the routing protocol; and
send the generated network protocol packet to a second router connected to the router, wherein the second router is adapted to route data packets using the routing protocol.

15. The system of claim 12 wherein the controller is further configured to:
receive a message from the selected route control server, wherein the message comprises router assignment information to form a mapping between the selected route control server and the router.

16. The system of claim 15 wherein the router assignment information comprises data indicating that the selected route control server is associated with the router.

17. The system of claim 12 wherein the generation of the routing information based on the routing computation result comprises converting the routing computation result to a flow, wherein the routing information comprises the flow.

18. The system of claim 12 wherein the control protocol comprises an OpenFlow protocol.

19. The system of claim 12 wherein:
the controller is further configured to send network topology information to the selected route control server; and
wherein the selected route control server is configured to generate the route computation result using the network protocol packet received at the router and the network topology information.

20. A non-transitory computer readable medium encoded with a computer program comprising instructions that, when executed, operate to cause a computer to:
receive a network protocol packet at a router adapted for routing data packets to one or more other routers, wherein the network protocol packet conforms to a routing protocol that provides distributed routing computation;
send the network protocol packet, through a controller, to a selected one of a plurality of route control servers;
process the network protocol packet at the selected route control server to generate a routing computation result that conforms to the routing protocol;
generate routing information based on the routing computation, wherein the routing information conforms to a control protocol that provides centralized routing computation;
send the routing information to the router for routing of data packets based on the control protocol;
detect a failure in the controller;
assign a second controller to manage communications between the router and the plurality of route control servers; and
transmit, from the second controller, a message to the plurality of route control servers and the router, wherein the message comprises controller status information.

21. The computer readable medium of claim 20 wherein the router is configured to use a centralized control protocol.

22. The computer readable medium of claim 20 further comprising instructions that, when executed, operate to cause the computer to:
use the routing computation result to generate a network protocol packet that conforms to the routing protocol; and
send the generated network protocol packet to a second router connected to the router, wherein the second router is adapted to route data packets using the routing protocol.

23. The computer readable medium of claim 20 further comprising instructions that, when executed, operate to cause the computer to:
prior to receiving the network protocol packet at the router:
at the controller, receive a message from the selected route control server, wherein the message comprises router assignment information to form a mapping between the selected route control server and the router.

24. The computer readable medium of claim 20 wherein the routing protocol comprises a border gateway protocol or an open shortest path first protocol.

25. The computer readable medium of claim 20 wherein the control protocol comprises an OpenFlow protocol.

26. The computer readable medium of claim 20 further comprising instructions that, when executed, operate to cause the computer to:
send, from the controller, network topology information to the selected route control server, wherein the generation of the route computation result uses the network protocol packet received at the router and the network topology information.

27. A method comprising:
establishing, by a controller, a connection with one or more route control servers and a connection with one or more routers, the one or more routers including a first router;

in response to detecting that a protocol packet is received at the first router, determining, by the controller, which of the one or more route control servers is associated with the first router;

sending, by the controller, the protocol packet and network topology information to the route control server determined to be associated with the first router;

receiving, by the controller, calculated route information from the determined route control server, wherein the route information is calculated from the protocol packet and the network topology information;

converting, by the controller, the received route information to a format compatible with centralized routing computation; and sending, by the controller, the converted route information to the first router.

28. The method of claim 27, further comprising:

receiving from the one or more route control servers information responsive to configuration messages;

generating, based on the responsive information, a mapping that represents relationships between the one or more routers and the one or more control servers, wherein the determining is based on the mapping; and sending, by the controller, the mapping to a backup controller.

29. The method of claim 27, further comprising:

receiving a message from the control server determined to be associated with the first router, wherein the message comprises router assignment information to form a mapping between the control server determined to be associated with the first router and the first router.

30. The method of claim 27, further comprising:

accessing a mapping prior to providing the protocol packet to the control server determined to be associated with the first router.

* * * * *